(12) United States Patent
Dendi et al.

(10) Patent No.: US 10,671,698 B2
(45) Date of Patent: *Jun. 2, 2020

(54) LANGUAGE TRANSLATION USING EMBEDDABLE COMPONENT

(71) Applicant: Microsoft Technology Licensing, LLC, Redmond, WA (US)

(72) Inventors: Vikram R. Dendi, Lynnwood, WA (US); Sandor L. Maurice, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 417 days.

This patent is subject to a terminal disclaimer.

(21) Appl. No.: 15/167,697

(22) Filed: May 27, 2016

(65) Prior Publication Data

US 2016/0275057 A1 Sep. 22, 2016

Related U.S. Application Data

(63) Continuation of application No. 12/745,611, filed on Jun. 1, 2009, now Pat. No. 9,405,745.

(51) Int. Cl.
*G06F 17/28* (2006.01)
*G06F 17/22* (2006.01)
*H04L 29/08* (2006.01)
*H04L 29/06* (2006.01)

(52) U.S. Cl.
CPC ........ *G06F 17/2247* (2013.01); *G06F 17/289* (2013.01); *H04L 67/02* (2013.01); *H04L 67/06* (2013.01); *H04L 67/42* (2013.01)

(58) Field of Classification Search
CPC .. G06F 17/28; G06F 17/2881; G06F 17/2836; G06F 17/289; G06F 17/30
USPC .......................................... 704/2, 3, 7, 8, 10
See application file for complete search history.

(56) References Cited

U.S. PATENT DOCUMENTS

| | | | |
|---|---|---|---|
| 6,119,078 | A | 9/2000 | Kobayakawa et al. |
| 6,311,194 | B1 | 10/2001 | Sheth et al. |
| 6,385,568 | B1 | 5/2002 | Brandon et al. |
| 6,526,426 | B1 | 2/2003 | Lakritz |
| 6,675,354 | B1 | 1/2004 | Claussen et al. |
| 6,829,746 | B1 | 12/2004 | Schwerdtfeger et al. |

(Continued)

OTHER PUBLICATIONS

"Final Office Action Issued in U.S. Appl. No. 12/475,611", dated Jun. 7, 2012, 25 Pages.

(Continued)

*Primary Examiner* — Qi Han (57) ABSTRACT

Aspects of the subject matter described herein relate to language translation. In aspects, a reference to a language translation component is embedded or otherwise inserted into a Web page. When the Web page is rendered, code corresponding to the language translation component may be downloaded and executed. Once executed, the translation component may access other content in the Web page and allow a user to request translation of the Web page. Upon receiving an indication that translation is desired, the translation component may send content in the Web page to a translation service and receive translated content. The translation component may then provide this translated content to a user viewing the Web page.

20 Claims, 8 Drawing Sheets

(56) References Cited

U.S. PATENT DOCUMENTS

| | | | |
|---|---|---|---|
| 6,865,716 B1 | 3/2005 | Thurston | |
| 6,868,447 B1* | 3/2005 | Slaughter | G06F 9/465 709/225 |
| 6,999,916 B2 | 2/2006 | Lin et al. | |
| 7,016,977 B1 | 3/2006 | Dunsmoir et al. | |
| 7,058,626 B1 | 6/2006 | Pan et al. | |
| 7,194,411 B2 | 3/2007 | Slotznick et al. | |
| 7,353,268 B2 | 4/2008 | Miyahira | |
| 7,363,377 B1* | 4/2008 | Alban | G06F 9/468 709/227 |
| 7,475,390 B2 | 1/2009 | Berstis et al. | |
| 7,490,167 B2 | 2/2009 | Pena et al. | |
| 7,607,085 B1 | 10/2009 | Lassesen | |
| 8,117,531 B1 | 2/2012 | Lueck | |
| 8,135,796 B1* | 3/2012 | Slaughter | G06F 9/465 709/217 |
| 2001/0034771 A1 | 10/2001 | Hutsch et al. | |
| 2001/0054086 A1 | 12/2001 | Miyahira | |
| 2002/0111967 A1 | 8/2002 | Nagase | |
| 2002/0188435 A1 | 12/2002 | Labarge | |
| 2003/0046058 A1 | 3/2003 | Stuckler et al. | |
| 2003/0115552 A1 | 6/2003 | Jahnke et al. | |
| 2003/0140316 A1 | 7/2003 | Lakritz | |
| 2004/0044517 A1 | 3/2004 | Palmquist | |
| 2004/0044518 A1 | 3/2004 | Reed et al. | |
| 2004/0167784 A1 | 8/2004 | Travieso et al. | |
| 2004/0168132 A1 | 8/2004 | Travieso et al. | |
| 2004/0177327 A1 | 9/2004 | Kieffer | |
| 2004/0237044 A1 | 11/2004 | Travieso et al. | |
| 2004/0260535 A1 | 12/2004 | Chen et al. | |
| 2005/0010419 A1 | 1/2005 | Pourhamid | |
| 2005/0043941 A1 | 2/2005 | Janakiraman et al. | |
| 2005/0155027 A1 | 7/2005 | Wei | |
| 2006/0080082 A1 | 4/2006 | Ravindra et al. | |
| 2006/0200766 A1 | 9/2006 | Lakritz | |
| 2006/0218511 A1 | 9/2006 | Kapoor | |
| 2007/0055489 A1 | 3/2007 | Annie et al. | |
| 2007/0250509 A1 | 10/2007 | Marti et al. | |
| 2008/0040094 A1 | 2/2008 | Wolgemuth et al. | |
| 2008/0281578 A1 | 11/2008 | Kumaran et al. | |
| 2008/0300859 A1 | 12/2008 | Chen et al. | |
| 2009/0024595 A1 | 1/2009 | Chen | |
| 2009/0043563 A1 | 2/2009 | Bode et al. | |
| 2009/0106296 A1 | 4/2009 | Sickmiller et al. | |
| 2009/0150853 A1* | 6/2009 | Larvet | G06F 8/20 717/101 |
| 2009/0192783 A1 | 7/2009 | Jurach et al. | |
| 2009/0282333 A1 | 11/2009 | Olsen et al. | |
| 2010/0305940 A1 | 12/2010 | Dendi et al. | |
| 2012/0005571 A1 | 1/2012 | Tang et al. | |

OTHER PUBLICATIONS

"Final Office Action Issued in U.S. Appl. No. 12/475,611", dated Sep. 26, 2014, 33 Pages "Non Final Office Action Issued in U.S. Appl. No. 12/475,611", dated Oct. 7, 2015, 32 Pages.

"Non Final Office Action Issued in U.S. Appl. No. 12/475,611", dated Mar. 15, 2012, 21 Pages.

"Non Final Office Action Issued in U.S. Appl. No. 12/475,611", dated May 19, 2014, 32 Pages.

"Notice of Allowance Issued in U.S. Appl. No. 12/475,611", dated Mar. 30, 2016, 17 Pages.

Bishop, Todd, "Microsoft's New Translation Tool Keeps Web Users on Same Page", Retrieved from <<https://web.archive.org/web/20090326101833/http://www.techflash.com/Microsofts_new_translation_tool_keeps_Web_users_on_same_page_41446302.html>>, Retrieved on: Mar. 18, 2009, 1 Page.

Clements, et al., "Globalink Power Translator 6—Barcelona Technology", In Proceedings of Machine Translation: Past, Present, Future : MT Summit VI, Oct. 29, 1997, pp. 247-248.

Montalbano, Elizabeth, "Microsoft Invites Developers to Test Web-Site Translator", Retrieved from <<http://www.techworld.com.au/article/296403/mix_-_microsoft_invites_d>>, Mar. 24, 2009, 3 Pages.

* cited by examiner

LANGUAGE TRANSLATION USING EMBEDDABLE COMPONENT

REFERENCE TO RELATED APPLICATION

This application is a continuation patent application of copending application with Ser. No. 12/475,611, filed Jun. 1, 2009, entitled "LANGUAGE TRANSLATION USING EMBEDDABLE COMPONENT", which is now allowed. The aforementioned application(s) are hereby incorporated herein by reference.

BACKGROUND

With the many language spoken in the world, Web pages may be found in many different languages. To assist in understanding these Web pages, some companies have provided language translation sites. A user may navigate to a translation web site, enter text or a reference to a web page to translate, and receive translated text. This mechanism for language translation is cumbersome and sometimes renders pages in undesirable ways.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to language translation. In aspects, a reference to a language translation component is embedded or otherwise inserted into a Web page. When the Web page is rendered, code corresponding to the language translation component may be downloaded and executed. Once executed, the translation component may access other content in the Web page and allow a user to request translation of the Web page. Upon receiving an indication that translation is desired, the translation component may send content in the Web page to a translation service and receive translated content. The translation component may then provide this translated content to a user viewing the Web page.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." Other definitions, explicit and implicit, may be included below.

Exemplary Operating Environment

Figure 1:
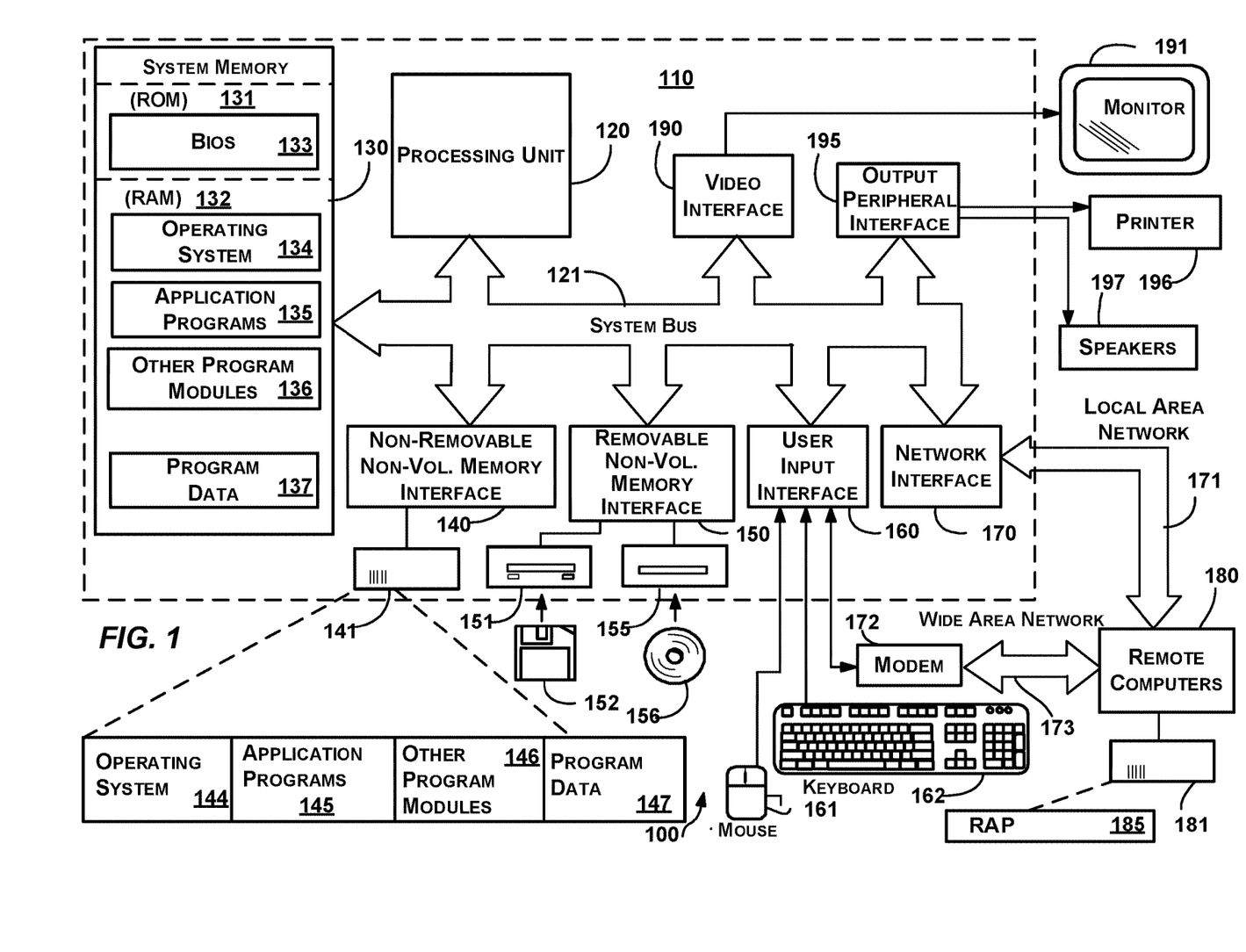
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Language Translation

Figure 2:
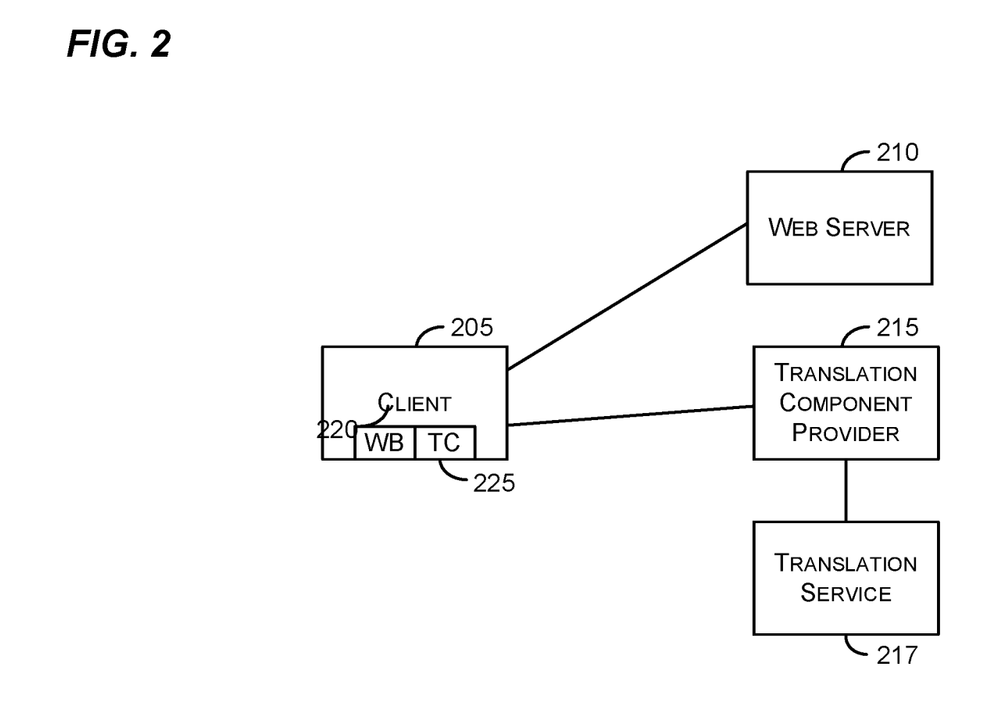
FIG. 2 is a block diagram representing an exemplary environment in which aspects of the subject matter described herein may be implemented.

As mentioned previously, language translation mechanisms for the Web are cumbersome and sometimes render pages in undesirable ways. FIG. 2 is a block diagram representing an exemplary environment in which aspects of the subject matter described herein may be implemented. The environment may include a client 205, a Web server 210, a translation component provider 215, a translation service 217, and may include other entities (not shown). The client may include a Web browser 220 that may include, generate, or download a translation component 225.

The various entities illustrated in FIG. 2 may be located relatively close to each other or may be distributed throughout the world. The various entities may communicate with each other via one or more local area networks, wide area networks, direct connections, virtual connections, private networks, virtual private networks, inter- and intra-process communication channels, shared memory, some combination of the above, and the like.

The client 205, Web server 210, translation component provider 215, and translation service 217 may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as the client 205, the Web server 210, or the translation service 217 comprises the computer 110 of FIG. 1.

The Web server 210, translation component provider 215, and translation service 217 may be implemented as one or more processes. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. In an embodiment, the client 205 and the server 210 may, at various times, both be peers, servers, or clients. In one embodiment, the client 205 and the server 210 may be implemented on the same physical machine.

The Web browser 220 is a component that allows a user to view and interact with Web pages. In operation, the Web browser 220 may receive a request to view a particular Web page on the Web server 210 and may request data corresponding to the Web page from the Web server 210. In conjunction with receiving the data, the Web browser 220 may render the Web page on a user interface associated with the client 205.

Data of a Web page may be divided into multiple portions that may be independently accessed by a renderer. A Document Object Model (DOM) may be used to access and manipulate these portions. These portions may include graphics, text, user interface elements, code, a reference to one of the above, a combination of two or more the above, and the like. Tags such as "div" and "/div" may be used to indicate where a particular portion begins and ends. Other tags may also serve to indicate where portions of a Web page begin and end.

As a renderer renders a Web page, it may come across a portion that indicates a script to execute. This portion may indicate that the script may be found on a server (e.g., the translation component provider 215) identified by a Uniform Resource Identifier (URI). When the renderer begins to render such a portion of the Web page, the renderer may contact the server identified by the URI to obtain the script.

A script includes code that may be executed. Code includes instructions that indicate the actions a computer is to take. Code may also include data, resources, variables, definitions, relationships, associations, and the like that include information other than actions the computer is to take. A browser may support JavaScript, JScript, another type of EMCAScript, another type of language, and the like.

In one embodiment, when a renderer comes across a portion of a Web page that indicates a script to execute, the renderer may download and execute the script to create a translation component 225. The translation component 225 may then be used to translate text in a Web page from one language to another language.

A portion of data in a Web page that indicates a script to execute to create a translation component 225 is sometimes referred to herein as a translation component snippet. An exemplary translation component snippet is as follows:

```
<div id="MicrosoftTranslatorWidget" style="width: 200px; min-height: 0px; border-color:
    #3A5770; background-color: #78ADD0;">
<noscript>
<ahref="http://www.microsofttranslator.com/BV.aspx?a=http%3a%2f%2fviks.org%2f">
    Translate this page</a><br />
    Translation powered by <a href="http://www.microsofttranslator.com/">Microsoft ®
    Translator</a>
</noscript>
```

-continued

```
</div>
<script id="MicrosoftTranslatorWidgetScript" type="text/javascript"
src="http://api.microsofttranslator.com/V1/Widget.svc/Embed?appId=SM0SH6dehT8aMefYwln
W6dh03oVhYVdo&from=en&layout=ts"></script>
```

For browsers that do not support or that have client-side scripting disabled, the <noscript> . . . </noscript> portion above provides a link to a translator Web page (e.g., Microsoft translator) and indicates a Web page to translate (e.g., http://viks.org). Browsers that do not support or that have client-side scripting disabled may navigate to the translator Web page and may pass the URI of the Web page to translate.

The <script> tag includes the identifier of a script, the type of the script, and a reference (e.g., a URI) where the script may be found. For browsers that support and have client-side scripting enabled, the <script> . . . </script> portion above causes the renderer to execute a script having a URI of http://api.microsofttranslator.com/V1/Widget.svc. Executing the script causes the translation component 225 to be instantiated. The translation component 225 may display a user interface similar to the one illustrated in FIG. 3.

The appId=SM0SH6dehT8aMefYwlnW6dh03oVhYVdo indicated above is a parameter that may be used to verify that the translation component 225 is authorized to access the translation service 217 for a particular Web site. For example, the parameter may encode a URI or a Web page through a secret hash function known to the translation service 217. When a renderer attempts to download the script to instantiate the translation component 225, the renderer may provide the parameter to the translation service 217. The translation service 217 may check the parameter and other information from the Web page to determine whether the Web browser 220 is to be given access to the script.

The appId may also be used to provide selective access to various features and services. For example, the appId may be associated with bandwidth throttling, whether advertisements are provided by the translation component 225, other features and services, and the like. Recognizing the features and services may be accomplished, for example, via an appId table hosted on the translation component provider 215 or translation service 217, by hashing the features into the appId beforehand, or the like.

In an embodiment, the appId parameter may be omitted. In this embodiment, the translation service 217 may forgo determining whether a requesting Web browser is allowed to access the script corresponding to the translation component 225.

In another embodiment, the translation service 217 may use information other than or in addition to the appId to determine whether to allow the requesting Web browser to access the script and to determine what features and services, if any, to provide the requesting Web browser. This other information may include, for example, an IP address white list, a mechanism of identifying the site of the Web browser or the Web page, a user or other ID associated with the Web browser, and the like.

In an embodiment, the translation component 225 may be injected into a Web page via a button displayed by the Web browser 220, a bookmarklet (e.g., a software component that runs in the context of the Web browser 220), a browser script, a browser add-on, some combination of the above, and the like.

The translation component 225 may execute in the context of the Web page and may thus have access to the DOM of the Web page. Having access to the DOM, the translation component 225 may obtain text in the DOM and may translate the text to another language.

To translate text to another language, the translation component 225 may enumerate one or more objects of a document object model corresponding to the Web page and send text found therein to the translation service 217. The translation service 217 may apply machine translation or other translation techniques to determine a translation for the text. After the translation service 217 has translated the text, the translation service 217 may then send the translated text back to the translation component 225. The translation component 225 may then display or make available the translated text to a user of the client 205.

In an embodiment, portions of the Web page may be marked (e.g., by a Webmaster, user, or the like) to indicate that they may or may not be translated via the translation component 225. For example, one or more pairs of tags in the Web page may indicate portions that may or may not be translated by the translation components. In the absence of such tags, the translation component 225 may default to translate or to not translate content or may determine whether it is to translate or not translate based on content, user preferences, or the like.

Images included in the DOM of the Web page may also be sent to the translation service 217. The translation service 217 may attempt provide substitute images that are suitable for the translation provided. In one embodiment, the translation service 217 may attempt to find a corresponding image for the new language to which text on the Web page is translated. In another embodiment, the translation service 217 may attempt to recognize text in the image and to translate the text in the image to the new language. In another embodiment, the translation service 217 may leave the image as is and may rely on add components, if any, within the Web page to find a new image appropriate to the translation.

In some embodiments, for security reasons, a Web browser may display a warning if a component in the Web browser attempts to access a server that was not originally indicated in the Web page. For example, if the translation component 225 attempts to directly access a server that hosts the translation service 217, the Web browser 220 may display a warning to indicate this action. To avoid this type of a warning, the translation component 225 may send text to be translated to the translation component provider 215. The translation component provider 215 may then send this text to the translation service 217, receive translated text, and send the translated text back to the translation component 225. This may be done to avoid the warning described previously.

The text that the translation component provider 215 sends to the translation service 217 may be derived from the text sent by the translation component 225 to the translation component provider 215. For example, the translation component provider 215 may add or remove tags to the text before sending it to the translation service 217. The translation component provider 215 may also add or remove tags or other data before sending a response to the translation component 225. This may be done, for example, to cause certain display features such as displaying translated or original text when a cursor is hovered on or near certain text as described below.

Although the environment described above includes various numbers of the entities and related infrastructure, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
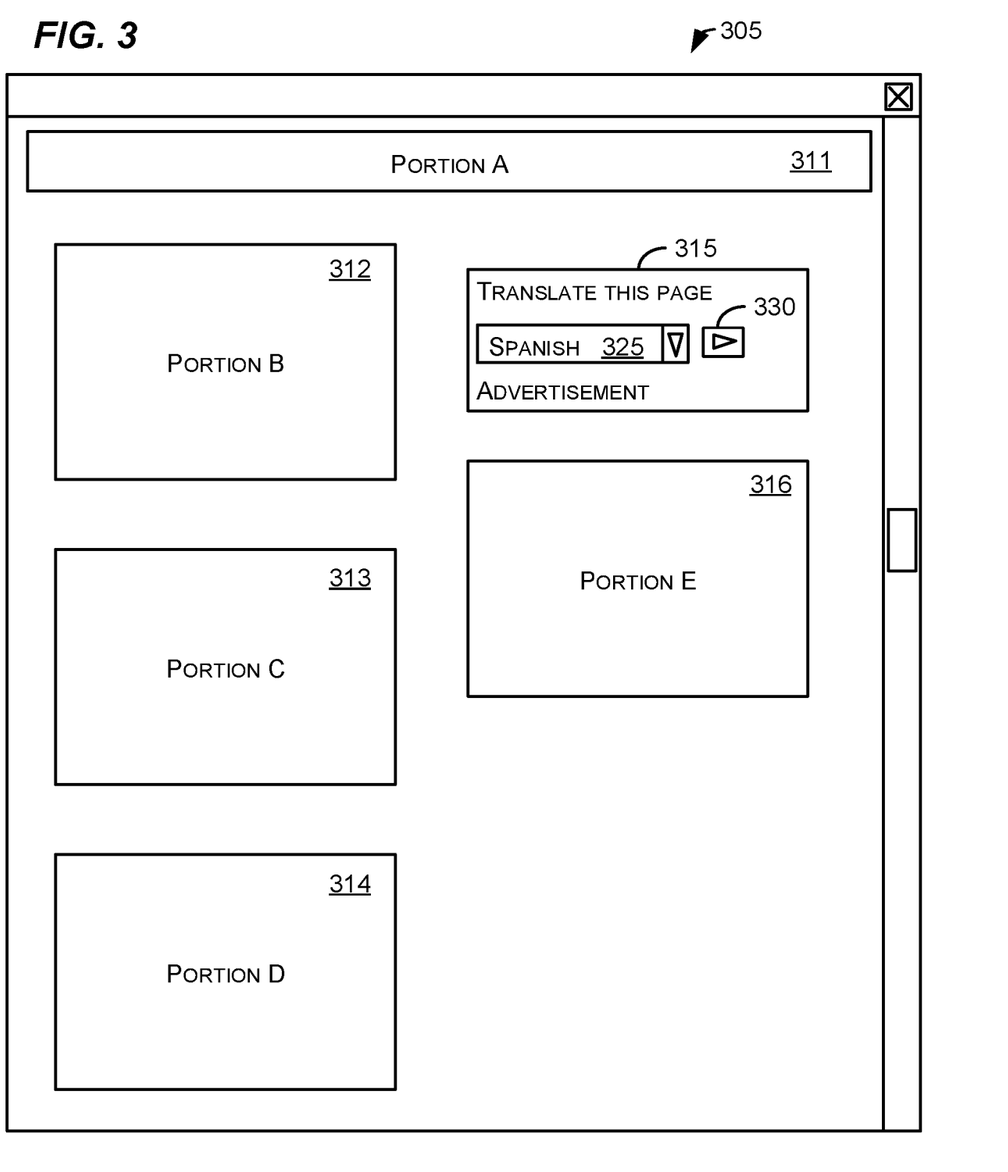
FIG. 3 illustrates elements of an exemplary Web page in accordance with aspects of the subject matter described herein.

FIG. 3 illustrates elements of an exemplary Web page in accordance with aspects of the subject matter described herein. The Web page 305 may include one or more portions 311-316. The portions may be organized by a DOM and may include graphics, text, user interface elements, code, a reference to one of the above, a combination of two or more of the above, and the like. In particular, the portion 315 may include a reference (e.g., a URI) to a service from which code corresponding to a translation component may be obtained.

The translation component may include a language selection element 325 that allows a user to select a language into which content on the Web page 305 is to be translated. In an embodiment, information associated with a user (e.g., a user profile) may be used to determine user preferences. A user preference may indicate the language the user prefers, how the user wants source and target languages displayed, another preference, and the like. The translation component may format and display content in accordance with the user preferences. Where the translation component does not have access to user preferences, the translation component may look at preferences (e.g., preferred language markers) indicated in the Web page, if any.

The translation component may also include a button 330 or other element that allows the user to indicate that translation is to occur. In addition, the translation component may provide one or more advertisements.

In an embodiment, any advertisements provided by the translation component may be collocated with the portion 315. In other embodiments, the advertisements associated with the translation component may be placed in various places within the Web page. The advertisements associated with the translation component may be selected based on a user profile, preferences associated with the Web page, content of the Web page, and the like. The advertisements associated with the translation component may be in addition to other advertisements, if any, included in the Web page.

The translation component may also indicate additional information regarding a translation. For example, the translation component may highlight, underline, or otherwise mark certain words or phrases. When a user clicks on a button or other user interface element, or selects, hovers a cursor over, or otherwise interacts with these words or phrases via a user interface, a definition, synonym, antonym, transliteration, or other information regarding the word or phrase may be displayed to the user. If a highlighted word or phrase includes a definition in one language but not in another language, the translation component may obtain a translation of the definition to provide to the user.

The translation component may also include one or more user elements that allow the user to indicate how the user wants translations displayed. Some exemplary contemplated formats include replacing content with translated content in place, displaying the original content and concurrently displaying translated content when the user hovers a cursor over text of the original content, displaying the translated content and concurrently displaying the original content when the user hovers a cursor over text of the translated content, and displaying the original content and the translated content side-by-side, one over the other, or in some other layout. Although these exemplary formats are provided, they are not intended to be all-inclusive or exhaustive of the formats possible. Indeed, based on the teachings herein, those skilled in the art may recognize many other formats suitable for displaying original and translated content.

Also, although the Web page illustrates six portions, it is to be understood that there may be more, fewer, or different-sized or configured portions without departing from the spirit or scope of aspects of the subject matter described herein.

Figure 4:
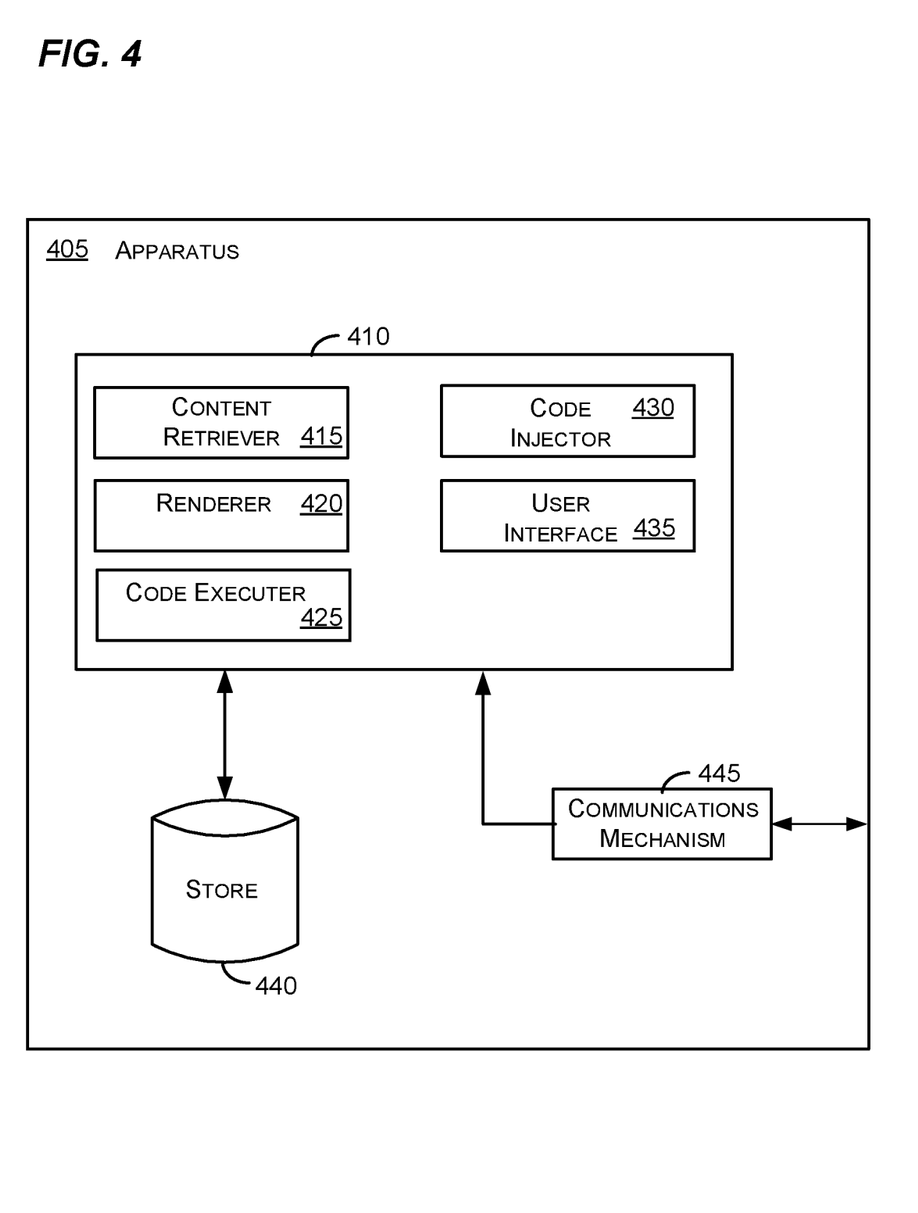
FIG. 4 is a block diagram that represents an apparatus configured in accordance with aspects of the subject matter described herein.

FIG. 4 is a block diagram that represents an apparatus configured in accordance with aspects of the subject matter described herein. The components illustrated in FIG. 4 are exemplary and are not meant to be all-inclusive of components that may be needed or included. In other embodiments, the components and/or functions described in conjunction with FIG. 4 may be included in other components (shown or not shown) or placed in subcomponents without departing from the spirit or scope of aspects of the subject matter described herein. In some embodiments, the components and/or functions described in conjunction with FIG. 4 may be distributed across multiple devices.

Turning to FIG. 4, the apparatus 405 may include browser components 410, a store 440, a communications mechanism 445, and other components (not shown). The apparatus 405 may be implemented on or as a computer (e.g., as the computer 110 of FIG. 1).

The browser components 410 correspond to the Web browser 220 of FIG. 2. The browser components 410 may include a content retriever 415, a renderer 420, a code executer 425, a code injector 430, a user interface 435, and other components (not shown).

The communications mechanism 445 allows the apparatus 405 to communicate with other entities (e.g., the server 210, provider 215, and translation service 217 of FIG. 2). The communications mechanism 445 may be a network interface or adapter 170, modem 172, or any other mechanism for establishing communications as described in conjunction with FIG. 1.

The store 440 is any storage media capable of storing data and may provide access to data needed to render Web pages. The term data is to be read to include information, program code, program state, program data, other data, and the like. The store 440 may comprise a file system, database, volatile memory such as RAM, other storage, some combination of the above, and the like and may be distributed across multiple devices. The store 440 may be external, internal, or include components that are both internal and external to the apparatus 405. Access as used herein may include reading data, writing data, deleting data, updating data, a combination including two or more of the above, and the like.

The content retriever 415 is operable to obtain data corresponding to a Web page. Data corresponding to the Web page may include one or more languages including, for example, HyperText Markup Language (HTML), Extensible Markup Language (XML), Extensible HyperText Markup Language (XHTML), another markup language, JavaScript, JScript, another type of EMCAScript, another language, and the like. The content retriever 415 may obtain this data from a Web server (e.g., the Web server 210 of FIG. 2), a store (e.g., the store 440), another device, or the like.

The renderer 420 is operable to use the data obtained by the content retriever 415 to create a graphical representation of the Web page to display on the user interface 435. This is sometimes referred to as "rendering" the Web page. In rendering a Web page, the renderer 420 may find a reference (e.g., a URI) to code in the data. The renderer 420 may use this reference to obtain the code, via the content retriever, from a service external to the apparatus 405. This code, when executed, may perform the functions of a translation component.

The code executer 425 is operable to execute the code obtained via the content retriever. In some embodiments, the code executer 425 may be part of the renderer 420. Being executed in the context of the Web page, the code has access to other portions of the Web page.

The translation component that is instantiated by executing the code is operable to send content from the Web page to a service external to the apparatus 405 and to receive translated content corresponding to the content from the service. The translation component may be further operable to display the translated content in the Web page via the user interface 435. The translation component may replace original content with translated content, display original and translated content concurrently (e.g., when a user hovers a cursor over content), or may display original and translated content in other ways previously indicated.

In conjunction with sending original content to the translation service, the translation component may obtain one or more images that were not indicated by the Web page before translation. The one or more images may be selected by the translation service to relate to the translated content.

The code injector 430 is operable to place an identifier (sometimes referred to as a "reference") into a Web page. The identifier (e.g., a URI) indicates a service from which to obtain code corresponding to the translation component. When the renderer 420 finds the identifier, the renderer 420 may instruct the content retriever 415 to obtain the code.

The user interface 435 is operable to display a representation of the translation component and to receive input that indicates that a translation is to be performed on content of the Web page.

FIGS. 5-8 are flow diagrams that generally represent actions that may occur in accordance with aspects of the subject matter described herein. For simplicity of explanation, the methodology described in conjunction with FIGS. 5-8 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Figure 5:
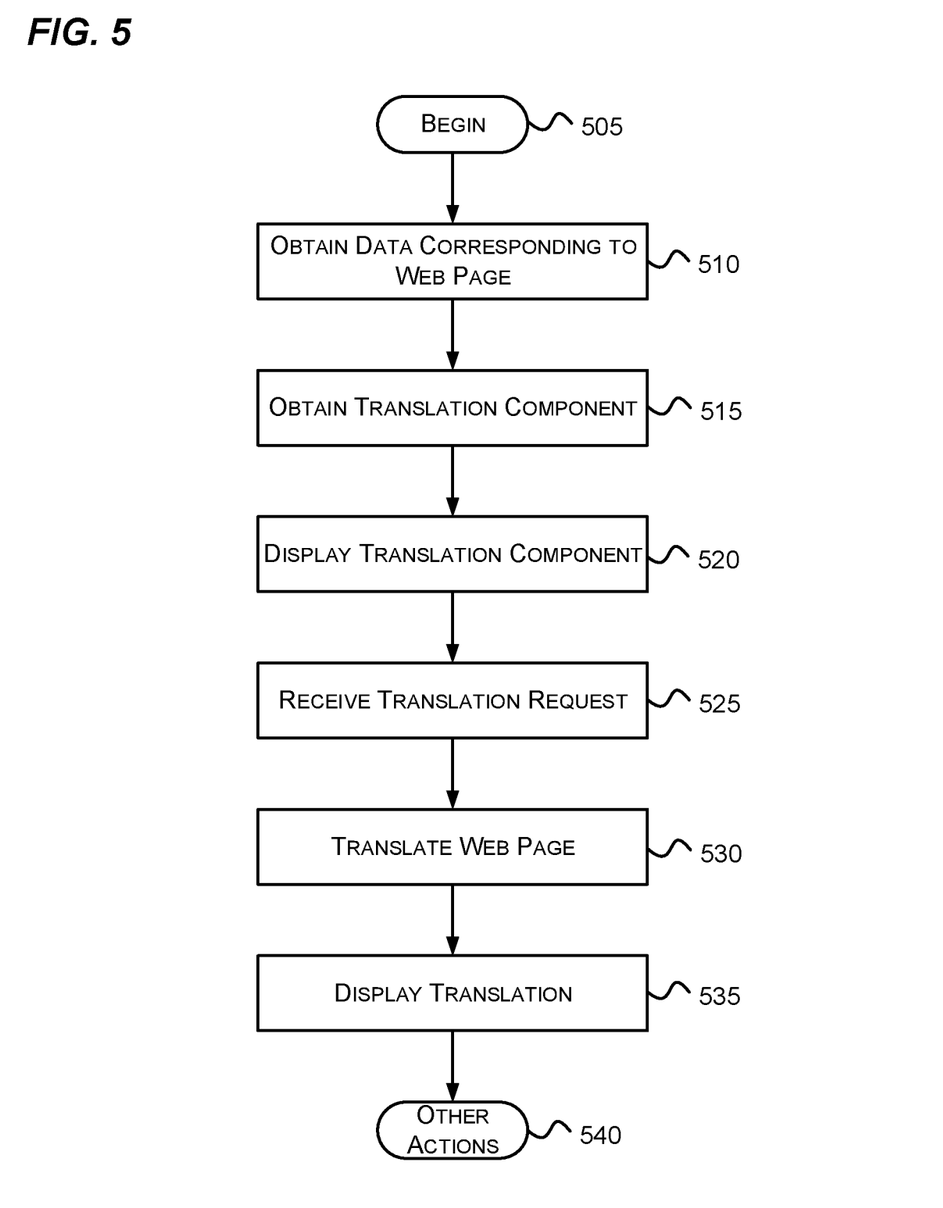
FIG. 5 is a block diagram that generally represents exemplary actions that may occur on a client in accordance with aspects of the subject matter described herein.

FIG. 5 is a block diagram that generally represents exemplary actions that may occur on a client in accordance with aspects of the subject matter described herein. Turning to FIG. 5, at block 505, the actions begin.

At block 510, data corresponding to a Web page is obtained. For example, referring to FIGS. 2 and 4, the content retriever 415 obtains data corresponding to a Web page from the Web server 210.

At block 515, a translation component is obtained. This may involve, for example:

1 Finding code within the data that references the translation component;

2. Downloading the translation component from a source external to a store from which the data was obtained; and 3. Executing the translation component in the context of the Web page. Executing the translation component in the context of the Web page allows the translation component to access other objects of the Web page.

For example, referring to FIGS. 2 and 4, the renderer 410 may find a reference to a translation component and may instruct the content retriever 415 to download code corresponding to the translation component from the translation component provider 215.

In some embodiment, a user interface may receive an indication that the user desires to inject a translation component into a Web page. In response, code that references the translation component may be placed into the Web page. This code may then be used to download the translation component from an external source as indicated above.

At block 520, a representation of the translation component is displayed on the user interface. The translation component is integrated such that it has access to content on the Web page. This is sometimes referred to as executing in the "context" of the Web page. For example, referring to FIG. 3, the translation component may be rendered similar to as shown in portion 315 of the Web page 305.

At block 525, input indicating that translation is to be performed on the Web page is received. This input may be received through a user interface and may be delivered to the translation component. For example, referring to FIG. 4, the user interface 435 may receive use input (e.g., a mouse click) that indicates that the user desires to have a Web page translated.

At block 530, the Web page (or a portion thereof) is translated. This may involve, for example:

1 Obtaining at least a portion of the Web page via the translation component;

2. Sending the portion of the Web page to a translation service; and

3. Receiving a translation of the portion of the Web page from the translation service.

For example, referring to FIG. 2, the translation component 225 may obtain a portion of the Web page and may send the portion to the translation service 217 for translation. In response, the translation component 225 may receive a translation of the portion.

At block 535, the translation is displayed under control of the translation component. Displaying under control of the translation component may involve changing text, images, or otherwise in a Web page and causing a refresh of the Web page, displaying a portion of the Web page together with a translation upon receiving an indication of a cursor being on or close to the portion, creating a new Web page that includes the translated text and causing the new page to be displayed, and the like. For example, referring to FIG. 4, the user interface 435 may be used to display the translation in any of the ways previously mentioned.

At block 540, other actions, if any, are performed.

Figure 6:
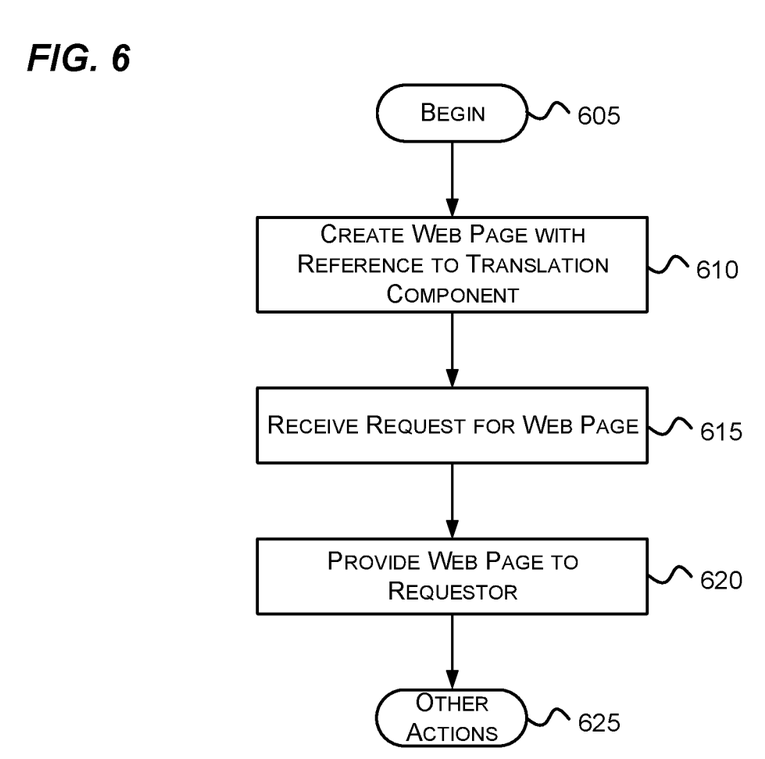
FIG. 6 is a block diagram that generally represents exemplary actions that may occur in creating and providing a Web page having a reference to a translation component in accordance with aspects of the subject matter described herein.

FIG. 6 is a block diagram that generally represents exemplary actions that may occur in creating and providing a Web page having a reference to a translation component in accordance with aspects of the subject matter described herein. At block 605, the actions begin.

At block 610, a Web page is created that includes a reference. The reference indicates code (e.g., a script) that is external to the Web page. The reference is usable to locate and download the code (e.g., from a translation component provider). The code is structured to execute in the context of the Web page such that it is able to access other objects in the Web page. The code, when executed, implements a translation component. The code is structured to receive input that indicates that the Web page is to be translated. In response to receiving the input, the code obtains content from the Web page and send the content (e.g., either directly or indirectly) to a translation service to translate the content. When the translated content is received, the code causes the translated content to be displayed. For example, referring to FIG. 2, a Web developer may develop a Web page and place a reference to the translation component provider in the Web page.

At block 615, a request for data corresponding to the Web page is received. For example, referring to FIG. 2, the Web server 210 may receive a request for the Web page from the Web browser 220 of the client 205.

At block 620, the data corresponding to the Web page is provided to the requestor. For example, referring to FIG. 2, the Web server 210 sends the requested data to the Web browser 220.

At block 625, other actions, if any, may be performed.

Figure 7:
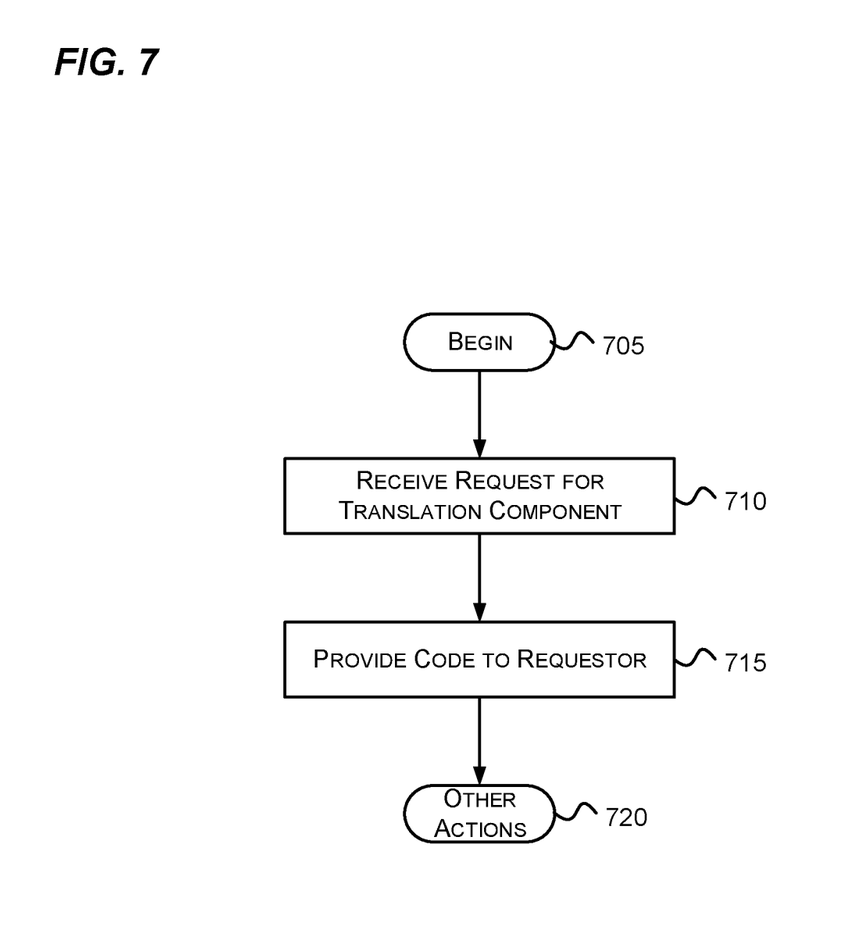
FIG. 7 is a block diagram that generally represents exemplary actions that may occur in providing code for a translation component in accordance with aspects of the subject matter described herein.

FIG. 7 is a block diagram that generally represents exemplary actions that may occur in providing code for a translation component in accordance with aspects of the subject matter described herein. At block 705, the actions begin.

At block 710, a request for the code of the translation component is received. For example, referring to FIG. 2, the Web browser 220 may request code for the translation component 225 from the translation component provider 215.

At block 715, the code is provided to the requestor. For example, referring to FIG. 2, the translation component provider 215 sends the code to the Web browser 220.

At block 720, other actions, if any, are performed.

Figure 8:
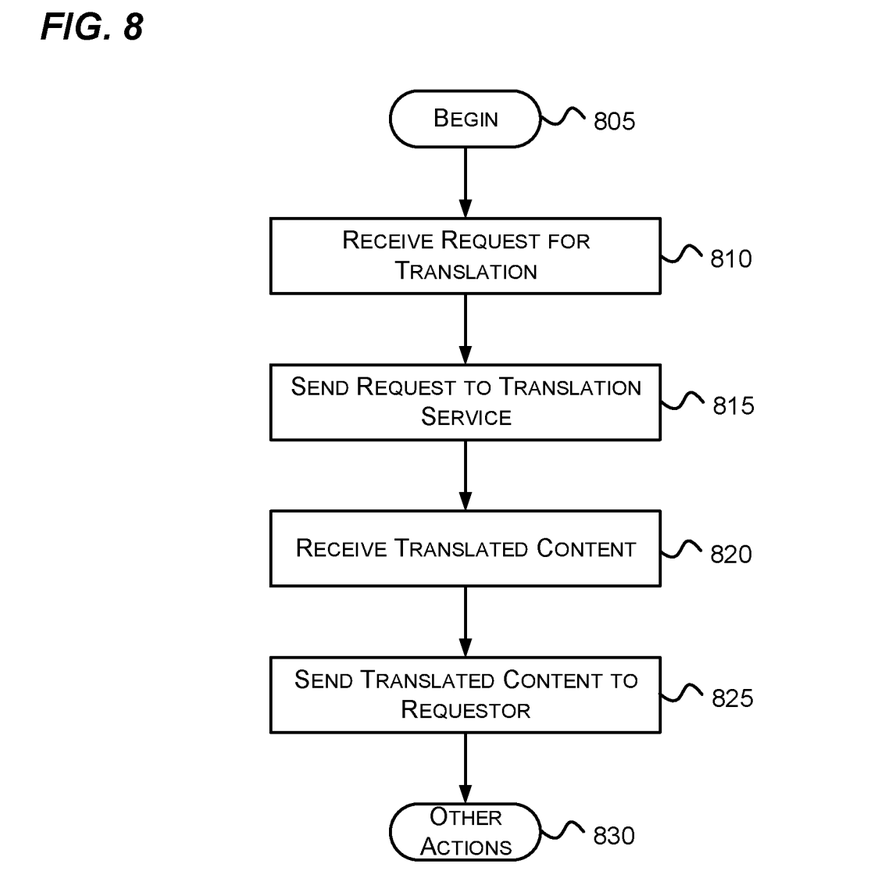
FIG. 8 is a block diagram that generally represents exemplary actions that may occur in translating content in accordance with aspects of the subject matter described herein.

FIG. 8 is a block diagram that generally represents exemplary actions that may occur in translating content in accordance with aspects of the subject matter described herein. At block 805, the actions begin.

At block 810, a content to translate is received from a requestor. For example, referring to FIG. 2, the translation component provider 215 may receive content to translate from the translation component 225.

At block 815, data derived from the request is sent to a translation service. For example, referring to FIG. 2, the translation component may add or remove tags or otherwise modify the content before sending it to the translation service 217 for translation.

At block 820, translated content corresponding to the sent content is received. For example, referring to FIG. 2, the translation component provider 215 may receive translated content from the translation service 217.

At block 825, data derived from the translated content is sent to the requestor. For example, referring to FIG. 2, the translation component provider 215 may add or remove tags or otherwise modify the translated content before sending it to the translation component 225.

For example, tags may be added that indicate the translated content. When a user hovers over the original content, the translated content may be displayed while the original content is highlighted.

As another example, tags may be added to indicate the original content. The translated content may then be displayed. When a user hovers over the translated content, the original content may be displayed while the translated content is highlighted.

At block 830, other actions, if any, are performed.

Although reference has been made herein to a reference to a translation component that is embedded in a Web page, in other embodiments, such a reference may be embedded in other types of documents. For example, a reference to a translation component may be inserted into a visual development environment, into a text document, a spreadsheet, a database, or virtually any other type of document. The application rendering the document may retrieve the translation component and display it similarly to that described previously.

It will be recognized that aspects of the subject matter described herein may operate transparently behind a firewall. For example, whatever pages a Web browser is able to access from behind a firewall, the translation component is also able to access.

As can be seen from the foregoing detailed description, aspects have been described related to language translation. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method performed by a plurality of server computers, the method comprising:

receiving, via a network, from a client computer, at a web server configured to serve hypertext markup language (HTML) pages to arbitrary client computers, a hypertext transfer protocol (HTTP) request for a HTML page, and responding to the HTTP request for the HTML page by transmitting, via the network, an HTTP reply message comprised of the HTML page, wherein the transmitted HTML page comprises markup elements including a first element comprising text in a first language and a script element comprising a uniform resource indicator (URI) identifying a network address and a location thereat of a script, and wherein the script is not included in the HTML page when the HTML page is transmitted to the client computer;

receiving, via the network, from the client computer, a request for the script, the request for the script having been sent by the client computer based on a browser at the client computer processing the HTML page received via the HTTP reply messages, the HTTP request for the script having been sent based on the client computer finding the script element in the obtained HTML page and by using the URI therein to send the HTTP request for the script to the network address, wherein the script is configured to, when executed by the client computer in a context corresponding to the HTML page that is comprised of a document object model (DOM) of the HTML page:
provide a displayable interactive user interface element configured to enable interactive selection of a target language in a rendering of the DOM displayed by the client computer;
respond to an activation of the user interface element to select the target language by:
extracting from the DOM the text in the first language, and
sending, via the network, to a translation service, a translation request comprising an indication of the selected target language and the extracted text,
receive, via the network, from the translation service, translated text comprising a translation of the sent extracted text in the target language, and respond to receipt of the translated text by replacing, in the DOM, the text in the first language with the received translated text.

2. A method according to claim 1, further comprising receiving, by the translation service, a key sent by the client computer, and based thereon determining, by the translation service, whether to perform translation.

3. A method according to claim 1, wherein the translation request comprises HTML code extracted from the HTML page, wherein the HTML code is included with the translated text that is sent to the client computer, wherein the HTML code is returned to the client computer with the translated text, and wherein the method further comprises adding to the returned HTML code, by the translation service, additional HTML code not originally included in the HTML page.

4. A method according to claim 3, wherein the added HTML code enables display of the text in the first language over a displayed rendering of the HTML page.

5. A method according to claim 3, wherein the added HTML code is configured to indicate the translated text.

6. A method according to claim 1, further comprising receiving, by the translation service, an image extracted from the DOM by the script and sent by the client computer to the translation service, and in response recognizing, by the translations service, text in the image, and based thereon selecting an image to return to the client computer.

7. A method according to claim 1, wherein the script is further configured to underline or highlight text in a rendering of the HTML page.

8. A method performed by a plurality of server computers, the method comprising:
receiving, via a network, from a client computer, at a web server configured to serve hypertext markup language (HTML) pages to arbitrary client computers, a request for an HTML page, and responding to the request for the HTML page by transmitting, via the network, a reply message comprised of the HTML page, wherein the transmitted HTML page comprises markup elements including a first element comprising text in a first language and a script element comprising a uniform resource indicator (URI) identifying a network address and a location thereat of a script, and wherein the script is not included in the HTML page when the HTML page is transmitted to the client computer; and
receiving, via the network, from the client computer, a request for the script, the request for the script having been sent by the client computer based on an HTML renderer at the client computer processing the HTML page received from the web server, the request for the script having been sent based on the HTML renderer identifying the script element in the obtained HTML page and having been sent to the network address based on the URI in the HTML page, wherein the script is configured to, when executed by the client computer in a context corresponding to the HTML page that is comprised of a document object model (DOM) of the HTML page:
provide a displayable interactive user interface element configured to enable interactive selection of a target language in a rendering of the DOM displayed by the client computer;
respond to an activation of the user interface element to select the target language by:
extracting from the DOM the text in the first language, and
sending, via the network, to a translation service, a translation request comprising an indication of the selected target language and the extracted text,
receive, via the network, from the translation service, translated text comprising a translation of the sent extracted text in the target language, and respond to receipt of the translated text by inserting the received translated text into the DOM.

9. A method according to claim 8, wherein the script is further configured to modify the DOM to cause a displayed rendering of the DOM to concurrently display the translated text with the text in the first language.

10. A method according to claim 8, further comprising a key in conjunction with the translating performed by the translation service, the translation service determining whether to translate based on the key.

11. A method according to claim 8, wherein the script is further configured to extract only text that has is marked in the HTML page as being subjected to translation.

12. A method according to claim 8, wherein the script is further configured to avoid extracting text that is marked in the HTML pages as not being subjected to translation.

13. A method according to claim 8, wherein the modifying the DOM comprises adding the translated text thereto to enable display of the translated text responsive to a hover interaction with a rendering of the HTML page.

14. A method according to claim 8, wherein the modifying the DOM enables display of the text in the first language responsive to a hover interaction with a rendering of the HTML page.

15. A method according to claim 8, further comprising selecting, by the translation service, an image determined to be relevant to the received extracted text and returning the selected image with the translated text.

16. A method performed by a plurality of server computers, the method comprising:
receiving, via a network, from a client computer, at a server configured to serve hypertext markup language (HTML) pages to client computers responsive to HTTP requests therefor, an HTTP request for an HTML page, and responding to the request for the HTML page by transmitting, via the network, a reply message comprised of the HTML page, wherein the transmitted HTML page comprises an authorization identifier and markup elements including a first element comprising text in a first language and a script element comprising a uniform resource indicator (URI) identifying a network address and a location thereat of a script, and wherein the script is not included in the HTML page when the HTML page is transmitted to the client computer;

receiving, via the network, from the client computer, a request for the script, the request for the script having been sent by the client computer based on a renderer at the client computer processing the HTML page received from the web server, the request for the script having been sent based on the renderer recognizing the script element in the obtained HTML page, the request for the script sent to the network address based on the URI, wherein the script is configured to, when executed by the client computer in a context corresponding to the HTML page that is comprised of a document object model (DOM) of the HTML page constructed and maintained by the renderer:

send the authorization identifier to a translation service;

provide a displayable interactive user interface element configured to enable interactive selection of a target language in a rendering of the DOM displayed by the client computer;

respond to an activation of the user interface element to select the target language by:
  extracting from the DOM the text in the first language, and
  sending, via the network, to a translation service, a translation request comprising an indication of the selected target language and the extracted text,
  receive, via the network, from the translation service, translated text comprising a translation of the sent extracted text in the target language, and respond to receipt of the translated text by inserting the received translated text into the DOM.

17. A method according to claim 16, wherein the translation service determines whether to include advertisements with the translated text based on the authorization identifier.

18. A method according to claim 16, wherein a server corresponding to the network address intermediates exchange of the translation request and the translated text between the client computer and the translation service.

19. A method according to claim 16, wherein the user interface element comprises a plurality of user-selectable target languages.

20. A method according to claim 16, wherein the script is further configured to format and display content in accordance with user preferences.

* * * * *